F. G. SARGENT.
SELF LUBRICATING LOOSE PULLEY OR WHEEL.
APPLICATION FILED MAR. 10, 1911.

1,017,810.

Patented Feb. 20, 1912.

Witnesses:

Inventor
F. G. Sargent
by Attorneys
Southgate & Southgate.

UNITED STATES PATENT OFFICE.

FREDERICK G. SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

SELF-LUBRICATING LOOSE PULLEY OR WHEEL.

1,017,810.  Specification of Letters Patent.  Patented Feb. 20, 1912.

Application filed March 10, 1911. Serial No. 613,512.

*To all whom it may concern:*

Be it known that I, FREDERICK G. SARGENT, a citizen of the United States, residing at Westford, in the county of Middlesex and State of Massachusetts, have invented a new and useful Self-Lubricating Loose Pulley or Wheel, of which the following is a specification.

This invention relates to that type of pulley, roller or wheel, which is designed to run loose on a shaft.

The principal objects of the invention are to provide a practicable arrangement of simple and inexpensive construction which can be employed practically under all conditions for the purpose of permitting the introduction of lubricant while the wheel or pulley runs, and causing the oil to be distributed on the bearing during the running operation and while the pulley is idle; also to provide for collecting the surplus lubricant in a chamber or chambers in such a way that it will not be likely to drip out of said chambers while the pulley is at rest;
to provide for supplying lubricant from either side of the pulley or wheel to the other; and to provide a simple and convenient arrangement for assuring the retention of substantially equal quantities of lubricant on the two sides of the pulley even though it may be introduced all from one end.

Further objects and advantages will appear hereinafter.

Reference is to be had to the accompanying drawings in which—

Figure 1:
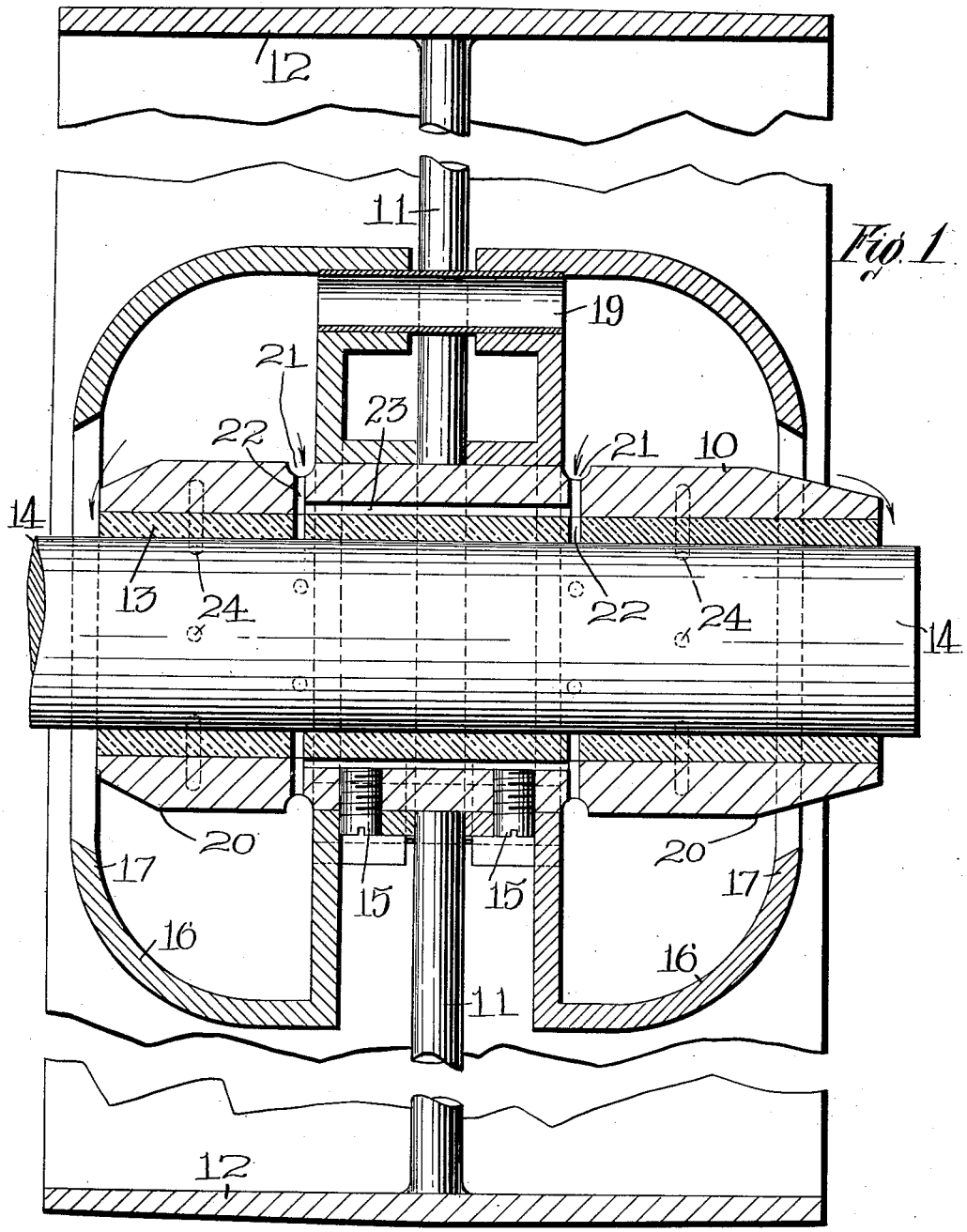
Figure 2:
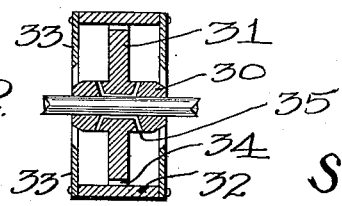

Figure 1 is a central sectional view of a loose pulley showing a preferred form of this invention applied thereto, and Fig. 2 is a similar view showing a modification.

Referring first to Fig. 1 it will be seen that the pulley or wheel is shown as comprising a hub 10, web 11, which in this case is shown as consisting of a series of spokes, and rim 12. The hub is provided with a bushing 13 and runs loosely on a shaft 14. Secured to the hub by means of set screws 15 are a pair of metal caps 16. Each of these caps is provided with a cylindrical portion at the outside and with inwardly extending flanges 17 at the ends thereof, these flanges being located substantially at the ends of the pulley. Each of these flanges has a circular opening at the end spaced from the end of the hub so that while the pulley is running a lubricant can be introduced into the chambers formed by the caps. These chambers are connected at intervals around the circumference by means of tubes 19 set into bosses on the two caps and passing through the web 11. These tubes constitute passages by which, when the pulley is at rest, the lubricant collecting in the bottom of the two chambers can pass freely from one to the other so the amount in both is equalized.

It is to be observed that the hubs are cylindrical for a distance but at their ends they are in the form of truncated cones. On this account, when the pulley is at rest, any lubricant dropping down on the hub but reaching the conical portion will run down the same either around the hub or to the end thereof, as indicated by the arrow at the left in Fig. 1. In this case it will be divided as the shaft passes around the same and run down the vertical end of the hub at the bottom and then on account of the inclined surface at that point, run down again to the point 20 from which it will drop into the chamber below. In this way it will be seen that the oil will not be lost from the casing and all surplus lubricant will be used for the purpose intended.

The hub is provided with a pair of grooves 21 for receiving lubricant from the casing and these are provided with passages 22 for connecting them with the bearing and conducting the lubricant thereto. The passages 22 are shown as connected by passages 23 so that in case of any stoppage, the lubricant will continue to flow, and so that each passage can be filled from lubricant at the other side of the pulley. These passages 22 are arranged around the circumference of the hub and another set of radial passages 24 are arranged in staggered relationship thereto.

In the form shown in Fig. 2 the hub 30 of the roller or truck shown is connected by a web 31 with the rim 32. The rim is provided with a pair of circular plates 33 secured by screws at its end and extending inwardly and spaced at their inner edges from the hub for the same purpose as in Fig. 1. The web is provided with passages 34 for the same purpose as the tubes 19 and with passages 35 for lubricating the bearing. The ends of the hub are shown conical as above.

In both forms of the invention the lubrication of the bearing is accomplished in the simplest manner while the pulley or wheel is rotating and it need be supplied by lubricant from one side only. In addition to this, when the rotation stops, the lubricant collects in the chambers provided for that purpose and is equalized on both sides so that when it starts again the lubrication will be efficient and uniform. The caps 16 and plates 33 which form the chambers for lubricant are readily removable and replaceable and yet are connected so that the liquid can flow from either chamber to the other.

While I have illustrated and described two preferred forms of the invention, I am aware that many other modifications can be made therein by any person skilled in the art without departing from the scope of the invention as expressed in the claims. Therefore, I do not wish to be limited to all the details of construction herein shown and described, but What I do claim is:—

1. The combination with a wheel, of a pair of caps removably secured to the hub thereof on opposite sides of the center of the wheel, each cap comprising a hollow disk-shaped member with an end opening near the end of the hub for the admission of a lubricant, and having passages communicating with the interior of the other cap, whereby the lubricant may flow freely from one cap to the other, the hub of the wheel being provided with passages for leading the lubricant to the shaft, and other passages for connecting the first named passages on opposite sides of the wheel, and also having a conical shaped end projecting beyond the end of the cap and having the base of the conical part within the cap for leading the lubricant that may be deposited thereon into a position to drop into said hollow caps.

2. As an article of manufacture, a self lubricating loose pulley or wheel comprising a hub, web and rim, a pair of caps removably secured on said hub on opposite sides of the web each comprising a circular chamber for receiving a lubricant and having flanges at their outer edges extending toward the hub and open at their ends so that a lubricant can be introduced, the hub having radial passages on opposite sides of the central web for conducting a lubricant to the bearing and longitudinal passages for connecting two of said radial passages on opposite sides of the web, whereby lubricant will flow from one side directly therethrough to the bearing surface on the other.

3. As an article of manufacture, a self-lubricating loose pulley or wheel comprising a hub, web and rim, a pair of caps removably secured on the wheel on opposite sides of the web, each extending toward the hub and open at its ends so as to provide a space around the hub through which a lubricant can be introduced, the hub extending as far outwardly as the outer boundary of said cap and having radial passages on opposite sides of the central web for conducting a lubricant to the bearing and longitudinal passages for connecting two of said radial passages on opposite sides of the web, whereby a lubricant will flow from one side directly through to the bearing surface on the other.

In testimony whereof I have hereunto set my hand, in the presence of two subscribing witnesses.

FREDERICK G. SARGENT.

Witnesses:
CHARLES G. SARGENT,
OSBORN H. CILLEY.

---

Copies of this patent may be obtained for five cents each, by addressing the "Commissioner of Patents, Washington, D. C."